(12) United States Patent
Etter et al.

(10) Patent No.: US 9,677,149 B2
(45) Date of Patent: Jun. 13, 2017

(54) METHOD FOR POST-WELD HEAT TREATMENT OF WELDED COMPONENTS MADE OF GAMMA PRIME STRENGTHENED SUPERALLOYS

(71) Applicant: ALSTOM Technology Ltd., Baden (CH)

(72) Inventors: Thomas Etter, Muhen (CH); Daniel Beckel, Wettingen (CH); Thomas Opderbecke, Untersiggenthal (CH); Guenter Ambrosy, Fislisbach (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 379 days.

(21) Appl. No.: 14/306,348

(22) Filed: Jun. 17, 2014

(65) Prior Publication Data
US 2014/0366995 A1    Dec. 18, 2014

(30) Foreign Application Priority Data

Jun. 18, 2013  (EP) .................................... 13172402

(51) Int. Cl.
| | | |
|---|---|---|
| *B23K 37/00* | (2006.01) | |
| *C21D 9/50* | (2006.01) | |
| *C22F 1/10* | (2006.01) | |
| *B23K 31/02* | (2006.01) | |
| *F01D 5/00* | (2006.01) | |
| *B23K 101/00* | (2006.01) | |

(52) U.S. Cl.
CPC .............. *C21D 9/505* (2013.01); *B23K 31/02* (2013.01); *C22F 1/10* (2013.01); *B23K 2201/001* (2013.01); *F01D 5/005* (2013.01)

(58) Field of Classification Search
CPC ...................................................... C21D 9/505
See application file for complete search history.

(56) References Cited

U.S. PATENT DOCUMENTS

| 7,128,532 B2 | 10/2006 | Petervary et al. | |
|---|---|---|---|
| 7,854,064 B2 | 12/2010 | Malley | |
| 2005/0194363 A1 | 9/2005 | Hu et al. | |
| 2009/0020191 A1* | 1/2009 | Messer | C21D 9/50 148/529 |
| 2012/0205014 A1 | 8/2012 | Bruck et al. | |
| 2013/0263977 A1* | 10/2013 | Rickenbacher | B05D 3/06 148/540 |

FOREIGN PATENT DOCUMENTS

| CN | 1714989 A | 1/2006 |
|---|---|---|
| CN | 1890395 A | 1/2007 |
| CN | 103084573 A | 5/2013 |
| EP | 0 726 333 | 8/1996 |
| EP | 1 016 487 | 7/2000 |
| GB | 1 508 099 | 4/1978 |
| JP | H06-198438 | 7/1994 |
| JP | 2002-364382 | 12/2002 |
| JP | 2007-308798 | 11/2007 |
| JP | 2011064077 | 3/2011 |
| WO | 2013/070578 | 5/2013 |

* cited by examiner

*Primary Examiner* — Jessee Roe
*Assistant Examiner* — Christopher Kessler
(74) *Attorney, Agent, or Firm* — Buchanan Ingersoll & Rooney PC

(57) ABSTRACT

A method for post-weld heat treatment of a without a filler material welded high strength component made of a gamma prime (γ') strengthened superalloy can include providing the welded component, heating the welded component by applying a rapid heating-up rate in the range of 20° C./min to 40° C./min during the entire temperature range from room temperature (RT) up to a temperature $T_1$ of at least 1000° C., holding the welded component at $T_1$ and then heating the component by applying a slow heating-up rate of about 5° C./min to a final temperature $T_f$, then holding the welded component at $T_f$ for a time $t_f$ sufficient for at least partially dissolving the gamma prime phase in a weld of the welded component and also in a base material surrounding the weld, and cooling the component with a cooling rate that is greater than or equal to about 20° C./min.

20 Claims, 3 Drawing Sheets

METHOD FOR POST-WELD HEAT TREATMENT OF WELDED COMPONENTS MADE OF GAMMA PRIME STRENGTHENED SUPERALLOYS

CROSS-REFERENCE TO RELATED APPLICATIONS

This application claims priority to European application 13172402.3 filed Jun. 18, 2013, the contents of which are hereby incorporated in its entirety.

TECHNICAL FIELD

The present invention relates to the technology of superalloys. It refers to a method for post-weld heat treatment of welded components, for example repaired turbine parts, formerly used and damaged in turbines under operation or joined new turbine parts, made of gamma prime ($\gamma'$) strengthened superalloys according to the preamble of claim 1. With the disclosed method cracking in the weld region of the welded parts can be avoided.

BACKGROUND

It is known that high strength nickel, cobalt or iron based superalloys, for example nickel based superalloys with other elements such as aluminum and titanium, have their high strength characteristics because of the precipitation hardening effect of the high degree of gamma prime phase in the material. It is also known that those superalloys are very difficult to weld successfully.

In document US 2005/0194363 A1 a multi-laser beam welding of high strength superalloys is described. The method uses an array of two or more lasers to perform the steps of heating, welding (wherein a superalloy powder is added as a filler material) and post-weld heat treatment in nearly simultaneous operation. The secondary laser spot heats the area that has just been welded, thus slows the rate of cooling encountered at the weld spot which helps to reduce or even to eliminates the hot cracking, but because of using a filler material during the welding it is expected that the strength properties of the weld are not sufficient.

Therefore, high strength welds are often done by laser welding, electron beam welding, or similar processes that can weld gamma prime strengthened superalloys without a filler material. Welding without a filler material has the advantage that the weld has a similar strength like the base material, which is joined. But it has the disadvantage that due to the rapid cooling inherent to the welding process few or no gamma prime precipitates are present in the weld.

This is the reason, why post-weld heat treatments are often necessary to adjust the microstructure of the parts. During that post-weld heat treatment the gamma prime phase also precipitates in the weld region. These precipitations cause crystallographic changes in the alloy resulting in smaller lattice parameter after heat treatment. The volume change associated with this precipitation can lead to cracking in the weld region which is called strain age cracking or post-weld heat treatment cracking.

Document U.S. Pat. No. 7,854,064 B2 discloses a method for repairing a turbine engine component. The method comprises the steps of providing a turbine component made of a cast or wrought Nickel base superalloy, including for example Waspaloy, IN-738, IN-792, IN-939, removing any defects from the component wherein the removing step comprises a solutioning heat treatment step with a rapid heating rate between 29 and 40° F./minute (16-23° C./min) as the component passes through a temperature in a range from 1100 to 1600° F. (593-871° C.), wherein the component and the replacement parts are no longer in that mentioned temperature range than 17 minutes. After the component has reached the desired solutioning temperature, it is held at temperature for about 3 to 5 hours, then cooled, and then welded by electron beam welding, plasma arc welding or gas tungsten arc welding (GTAW) to effect the repair. A slow post-solution treatment cooling rate with a cooling rate of 0.5 to 10° F./minute (0.3-5.6° C./min), preferable 0.5 to 1.0° F./minute (0.3-0.6° C./min) is used from solutioning temperature to below 1250° F. (677° C.) to substantially prevent weld cracks and enhancing weldability. The slow cooling rate shall allow a significant time for $\gamma'$ precipitation to occur during cooling and to grow significantly. This reduces their hardening capability and increases high temperature ductility.

In addition, it is disclosed in document U.S. Pat. No. 7,854,064 B2 that the welded turbine component could be subjected to a post-weld heat treatment. The same heating and cooling rates for the post-weld heat treatment are used as for the above-mentioned pre-weld heat solutioning treatment, that means that a rapid heating rate in the range from 29° F./minute to 40° F./minute (16-23° C./min) is used as said welded turbine engine component is in a temperature range of from 1100 to 1600° F. (593-871° C.), and the cooling of said welded turbine engine component from the maximum solution heat treatment temperature to a temperature below 1250° F. (677° C.) is done very slowly at a cooling rate from 0.5 to 10° F./minute, preferable from 0.5 to 1° F./minute (0.3-5.6, preferably 0.3-0.6° C./min). This modified post-weld heat treatment is applied to eliminate the microstructural features generated by the pre-weld solution treatment's slow cooling rate and restore specification mechanical properties.

Although the method disclosed in U.S. Pat. No. 7,854,064 B2 has the advantage that turbine components made of Nickel based superalloys could be repaired e.g. welded virtually without the presence of microcracks it has the disadvantage of being time and cost consuming with respect to the described multiple steps of pre-weld and post-weld heat treatment.

Document US2012/0205014 A1 describes an inertia friction weld of superalloys with enhanced post-weld heat treatment. Friction welding avoids solidification cracking, but because of the cold working during friction welding (plastically deformation of at least one of the deposit material and the superalloy substrate) residual stresses are induced. Therefore, a heat treatment is proposed comprising a post-weld intermediate stress-relief (ISR) treatment, followed by a solutioning treatment, followed by a precipitation hardening heat treatment. The ramp time to 870° C. is about 102 minutes for the ISR, that means a heating rate of about 8 to 9° C./min, which is relative low.

SUMMARY

It is an object of the present invention to provide an efficient method for heat treatment of without a filler material welded components, e.g. welded by electron beam welding or laser welding, wherein said components are made of gamma prime ($\gamma'$) strengthened superalloys. The method shall ensure that cracking in the weld and the weld region can be avoided. Such components are preferably turbine parts and the method should be applicable to repairing turbine parts damaged during operation (service) as well as to joining together new parts of turbine components.

The method according to the preamble of independent claim 1 is a method for post-weld heat treatment of a without a filler material electron-beam welded high strength component made of a gamma prime (γ') strengthened superalloy based on Ni or Co or Fe or combinations thereof.

The method consisting of the following steps
 a) providing the welded component, then
 b) heating the welded component by applying a rapid heating-up rate in the range of about 20 to 40° C./min during the entire temperature range from RT up to a temperature $T_1$ of at least 1000° C., then
 c) holding the welded component at $T_1$ and then heating the component by applying a slow heating-up rate of about 5° C./min to a final temperature $T_f$, then
 d) holding the welded component at $T_f$ for a time $t_f$, wherein isothermal dwell time $t_f$ is sufficient for at least partially dissolving the gamma prime phase in the weld and also in the base material surrounding the weld; then
 e) cooling the component with a cooling rate of about ≥20° C./min and
 f) finally optionally applying a precipitation hardening treatment according to the known state of the art.

The heating-up rate according to step b) is to be high enough to at least minimize, preferably to avoid gamma prime precipitations in the weld.

The rapid cooling rate of about ≥20° C./min according to step e) leads as an advantage to a fine gamma prime precipitation.

Preferable embodiments of the method are described in the dependent claims.

With the application of the rapid heating-up rate during the post-weld treatment it is achieved that the gamma prime precipitations in the weld can be minimized resp. avoided. The final heat treatment of the part is then done at a temperature and a time long enough that the gamma prime phase is at least partially dissolved also in the base material surrounding the weld. Upon cooling, gamma prime precipitations are formed in the weld and the base material as well.

However, due to the partial dissolution of the gamma prime phase in the base material during the hold time $t_f$, the formation rate as well as the amount of the gamma prime phase in the weld and the base material during cooling is similar, thus—as an advantage—cracking can be avoided.

The present invention does not depend on a specific pre-weld heat treatment as for example disclosed in U.S. Pat. No. 7,854,064 B2. Thus it is much more efficient because the pre-weld method steps, described in the mentioned U.S. patent, are here in the present invention obsolete.

In addition, the present method can not only be used for repairing components by welding or inserting coupons, but also for manufacturing new components, for example fabrication of modular parts welded together to form the new component.

The method is applicable for all gamma prime strengthened superalloys (for example but not limited to those known under their brand names e.g. IN738, Mar-M247, CM247LC, CMSX-4, MK4HC, MD2) and only in connection where no other means of crack avoidance exist, i.e. welding processes without weld filler. Using ductile weld filler could also help avoiding crack formation; however the use of such weld fillers weakens the weld joint.

According to an embodiment of the invention the heating-up rate according to step b) is about 25-40° C./min, preferably about 25-35° C./min. One preferable range is about 20-30° C./min. This is dependent on the used specific superalloy material.

It is an advantage when the cooling rate according to step e) is nearly in the same range like the heating-up rate according to step b) in the post-weld heat treatment.

BRIEF DESCRIPTION OF THE DRAWINGS

The present invention is now to be explained more closely by means of different embodiments and with reference to the attached drawings.

DETAILED DESCRIPTION

Two IN738LC test plates in the solutioning heat treated conditions were joined by electron beam welding without using any weld filler. The two plates could be described schematically as two modular parts of a new turbine component, for example a turbine blade, which should be joined together. No special welding conditions were applied. Without any post-weld heat treatment there are cracks in the weld region (so called strain age cracking).

Figure 3:
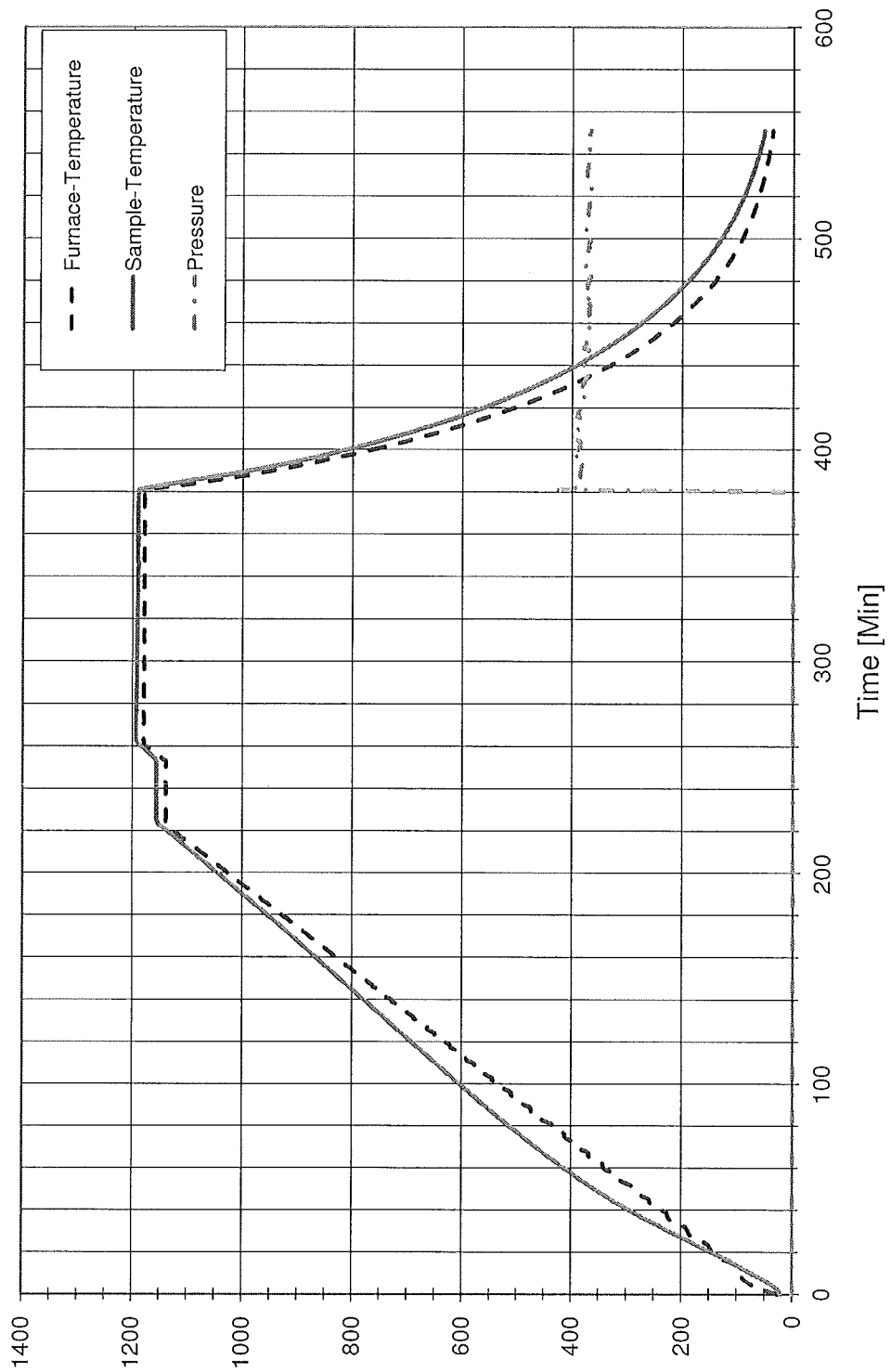
FIG. 3 shows the time-temperature-diagram for the applied post-weld treatment according to the known "standard" heat treatment and FIG. 4 shows the time-temperature-diagram for the applied post-weld treatment according to one embodiment of the invention.
Figure 4:
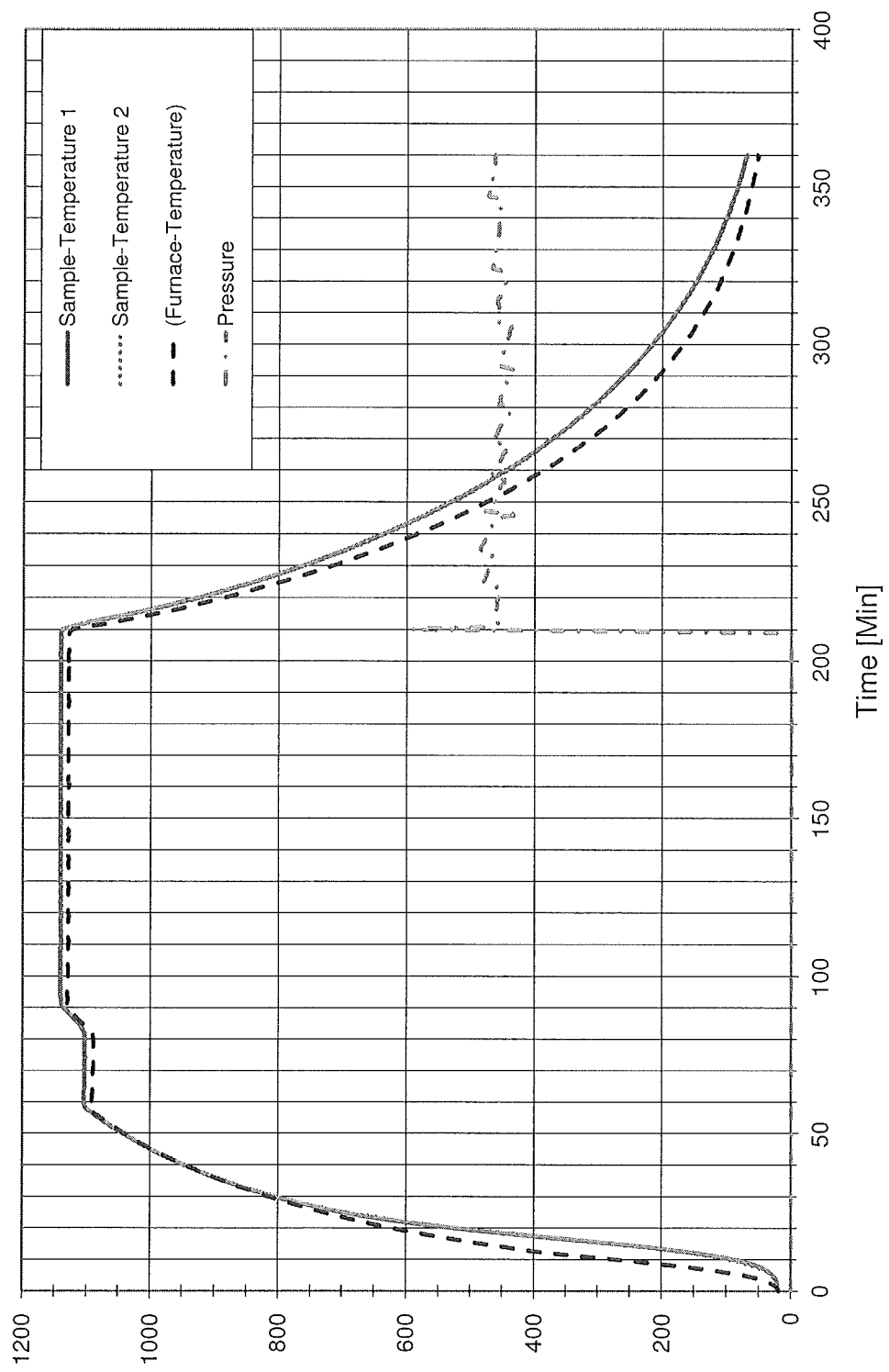

FIG. 3 and FIG. 4 show the time-temperature-diagrams of the "standard" heat treatment (FIG. 3) and of the applied post-weld heat treatment to that component according to one embodiment of the present invention (FIG. 4).

The following heat treatment trials with different temperatures and heating-up rates were performed for IN738LC:
 1. Standard heat treatment:
  1140° C./0.5 h (~5° C./min)+1180° C./2 h (~5° C./min)
 2. Modified/optimized heat treatment according to the present invention:
  1100° C./0.5 h (~20-30° C./min)+1140° C./2 h (~5° C./min)+optionally 850° C./17 h
  The last step (850° C./17 h) is not shown in FIG. 4. The average cooling rate between 1140° C. and 850° C. was ~20° C./min.

The welded component was subjected to a post-weld heat treatment according to the invention with a rapid heating-up rate of about 20-30° C./min in the range of RT (room temperature) to 1100° C. (see FIG. 4), an exact measure of the heating up rate was done in the temperature range of about 400 to 1100° C. Then, after a holding time of 0.5 at 1100° C. the component was heated with a lower heating-up rate of ~5 C/min to 1140° C., which is slightly below the solutioning temperature of the used superalloy, and exposed to an isothermal dwell at 1140° C. for two hours, before cooling down with about 20° C./min (average cooling rate between 1140° C. and 850° C.).

Figure 1:
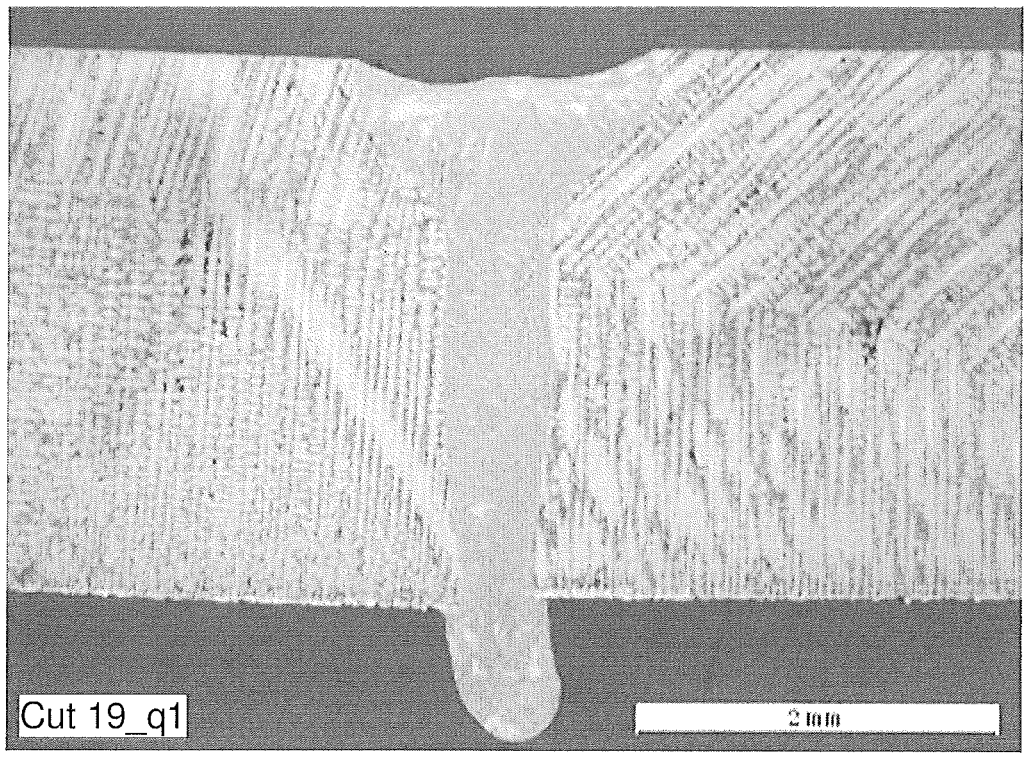
FIG. 1 shows a metallographic cut of a IN738LC test specimen treated according to the disclosed method after the cooling step of the post-weld treatment.

As can be seen from FIG. 1, in which the metallographic cut of the weld and the surrounding base material is shown after that described post-weld treatment, no cracks were observed.

With the application of the rapid heating-up rate during the post-weld treatment it is achieved that the gamma prime precipitations in the weld can be minimized resp. avoided. The final heat treatment of the part is then done at a temperature and a time long enough that the gamma prime phase is at least partially dissolved also in the base material surrounding the weld. Upon cooling, gamma prime precipitations are formed in the weld and the base material as well. However, due to the partial dissolution of the gamma prime phase in the base material during the hold time, the formation rate as well as the amount of the gamma prime phase in the weld and the base material during cooling is similar, thus—as an advantage—cracking can be avoided.

Figure 2:
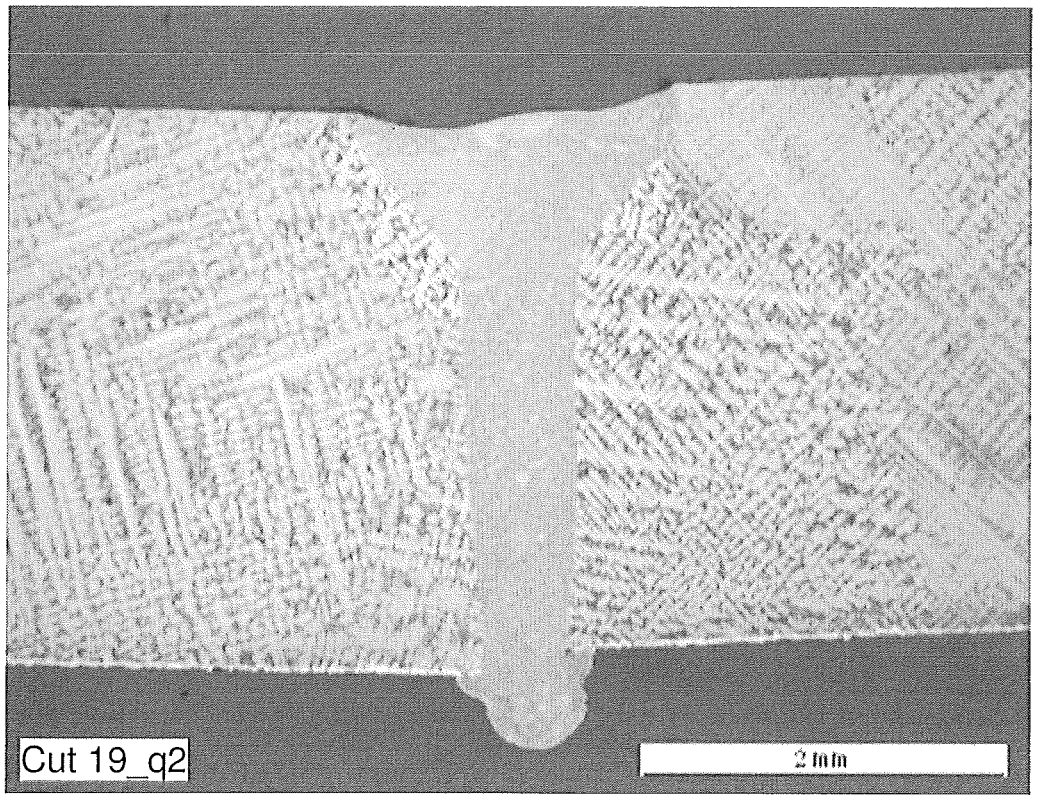
FIG. 2 shows a metallographic cut of the IN738LC test specimen according to FIG. 1, but after an additional subsequent precipitation hardening.

In addition, also a subsequent precipitation hardening at about 850° C. for 17 hours did not lead to the formation of cracks (see FIG. 2).

In contrast, a weld joint that was processed in the same way did not exhibit cracks in the as-welded condition, but revealed cracks in the weld joint after post-weld treatment when the heating-up rate is only about 5° C./min (see FIG. 3, standard heat treatment. The cracks were already visible by Fluorescent penetrant inspection (FPI), therefore it was not necessary to prepare metallographic cuts.

Even a higher heating-up rate (>30° C./min) is beneficial for alloys with a higher amount of gamma prime than IN738LC, such as CM247LC or CMSX-4. In addition, the isothermal dwell temperature can be increased as well, depending on the solution temperature of the alloys.

The present invention is not limited to the described embodiments. It could be used with advantage for all gamma strengthened superalloys where no other means of crack avoidance exist (i.e. welding processes without weld filler).

The invention claimed is:

1. A method for post-weld heat treatment of a without a filler material welded high strength component made of a gamma prime (γ') strengthened superalloy comprised of Ni or Co or Fe or combinations thereof, the method consisting of the following steps:
    a) providing the welded component, then
    b) heating the welded component by applying a rapid heating-up rate in the range of about 20° C./m in to 40° C./min during the entire temperature range from room temperature (RT) up to a temperature $T_1$ of at least 1000° C., then
    c) holding the welded component at $T_1$ and then heating the component by applying a slow heating-up rate of about 5° C./min to a final temperature $T_f$, then
    d) holding the welded component at $T_f$ for a time $t_f$ sufficient for at least partially dissolving the gamma prime phase in the weld and also in a base material surrounding the weld, then
    e) cooling the component with a cooling rate of about 20° C./min, and
    f) finally optionally applying a precipitation hardening treatment.

2. The method according to claim 1, wherein the rapid heating-up rate according to step b) is high enough to avoid gamma prime precipitations in a weld of the welded component.

3. The method according to claim 2, wherein the rapid heating-up rate is about 25° C./min to 40° C./min.

4. The method according to claim 3, wherein the rapid heating-up rate is about 25° C./min to 35° C./min.

5. The method according to claim 2, wherein the rapid heating-up rate is about 20° C./min to 30° C./min.

6. The method according to claim 1, wherein the cooling rate according to step e) is 20° C./min.

7. The method according to claim 1, wherein said method is used for repairing components.

8. The method according to claim 1, wherein said method is used for joined new parts/components.

9. The method according to claim 1, wherein the welded component is welded by electron beam welding.

10. The method according to claim 1, wherein the welded component is welded by laser welding.

11. The method according to claim 1, wherein the precipitation hardening treatment is applied.

12. The method according to claim 1, wherein the applying of the precipitation hardening treatment is performed such that the welded component is held at 850° C. for a precipitation hardening treatment time period.

13. The method according to claim 1, wherein the rapid heating-up rate according to step b) is high enough to minimize gamma prime precipitations in a weld of the welded component.

14. The method according to claim 1, wherein the holding of the welded component at $T_f$ for the time $t_f$ is holding the welded component for an isothermal dwell time.

15. The method according to claim 1, wherein the providing of the welded component comprises electron beam welding a component of a turbine or laser welding a component of a turbine.

16. The method according to claim 1, wherein $T_1$ is 1100° C.

17. The method according to claim 1, wherein $T_f$ is 1140° C.

18. The method of claim 1, wherein the cooling of the component with a cooling rate of about 20° C./min is performed until the component is at a precipitation hardening treatment temperature.

19. The method of claim 18, wherein the applying of the precipitation hardening treatment is performed at the precipitation hardening treatment temperature for a precipitation hardening treatment time period.

20. A method for post-weld heat treatment of a without a filler material welded high strength component made of a gamma prime (γ') strengthened superalloy comprised of Ni or Co or Fe or combinations thereof, the method comprising:
    a) providing the welded component,
    b) heating the welded component by applying a rapid heating-up rate in the range of 20° C./m in to 40° C./m in during the entire temperature range from room temperature (RT) up to a temperature $T_1$ of at least 1000° C.,
    c) holding the welded component at $T_1$ and then heating the component by applying a slow heating-up rate of about 5° C./min to a final temperature $T_f$, then
    d) holding the welded component at $T_f$ for a time $t_f$ sufficient for at least partially dissolving the gamma prime phase in a weld of the welded component and also in a base material surrounding the weld, and
    e) cooling the component with a cooling rate that is greater than or equal to about 20° C./min.

* * * * *